United States Patent
Robbins et al.

[11] Patent Number: 6,012,889
[45] Date of Patent: Jan. 11, 2000

[54] FINISHING COVER FOR FASTENERS

[75] Inventors: Norman B. Robbins, Davison; Thomas R. Young, Lapeer; Donald W. Lucas, Plymouth, all of Mich.

[73] Assignee: Chrysler Corporation, Auburn Hills, Mich.

[21] Appl. No.: 09/162,401

[22] Filed: Sep. 28, 1998

Related U.S. Application Data

[63] Continuation-in-part of application No. 08/920,918, Aug. 29, 1997, abandoned.

[51] Int. Cl.[7] .............................. F16B 19/00; F16B 33/00; F16B 37/14
[52] U.S. Cl. ....................... 411/372.6; 411/373; 411/431; 411/908
[58] Field of Search ................................ 411/372, 372.5, 411/372.6, 373, 430, 431, 908

[56] References Cited

U.S. PATENT DOCUMENTS

| | | | |
|---|---|---|---|
| 4,753,405 | 6/1988 | Camilleri | 411/45 X |
| 5,653,564 | 8/1997 | Nakamura | 411/373 |

FOREIGN PATENT DOCUMENTS

| | | | |
|---|---|---|---|
| 608864 | 9/1960 | Italy | 411/373 |

OTHER PUBLICATIONS

Caplugs® "Finishing Parts", Catalog 595, Copyrighted 1995 by Protective Closure, Inc., p. 52.

*Primary Examiner*—Neill Wilson
*Attorney, Agent, or Firm*—Kenneth H. Maclean

[57] ABSTRACT

A unitary cover includes a base and a cap portion which are moveable relative to one another into a closed operative condition to conceal a fastener head or nut. The generally flat base has an aperture therethrough for extension of the fastener's shank while the portions about the aperture serve as a washer for the fastener head or nut. The cap portion has an oblong and dome-like shape and shares a thin edge with an edge of the base which forms a living hinge therebetween to allow the base and cap to pivot between opened and closed operative positions with respect to one another. Free edge portions of the base and of the cap engage when moved into a closed operative position. Specifically, an inwardly projecting catch formation on the cap edge encounters a beveled formation on the base edge to flex the cap edge outward an allow the catch formation to be trapped by the bevel formation thereby securing the edges together. Release of the catch formation from the bevel formation is accomplished by squeezing the opposed ends of the cap portion which flexes the catch formation outward from the bevel.

5 Claims, 6 Drawing Sheets

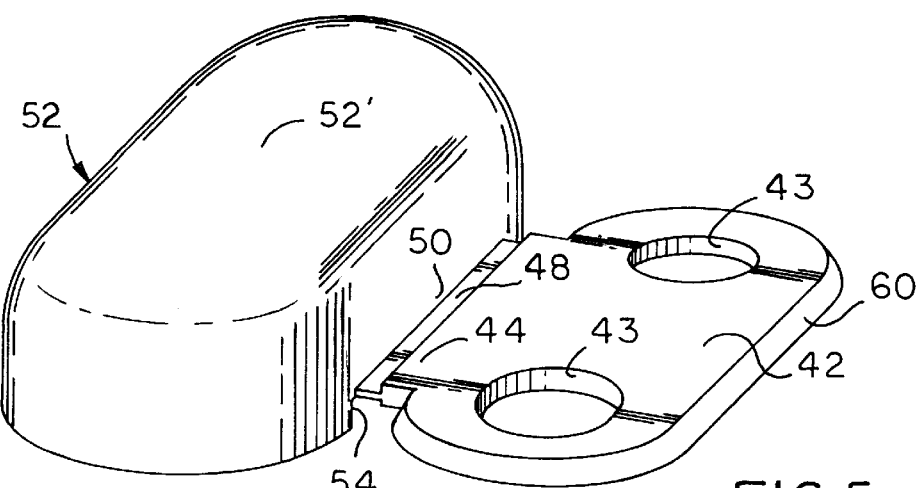
FIG.5
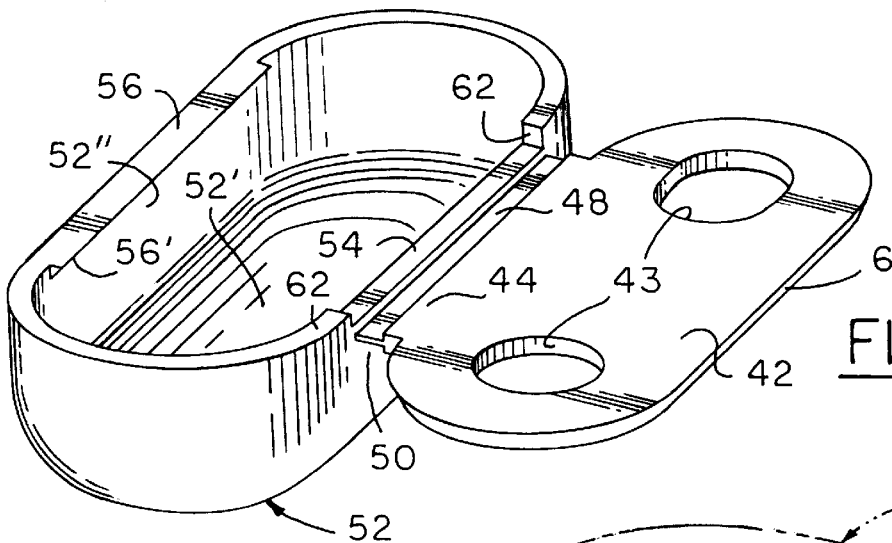
FIG.6
FIG.7
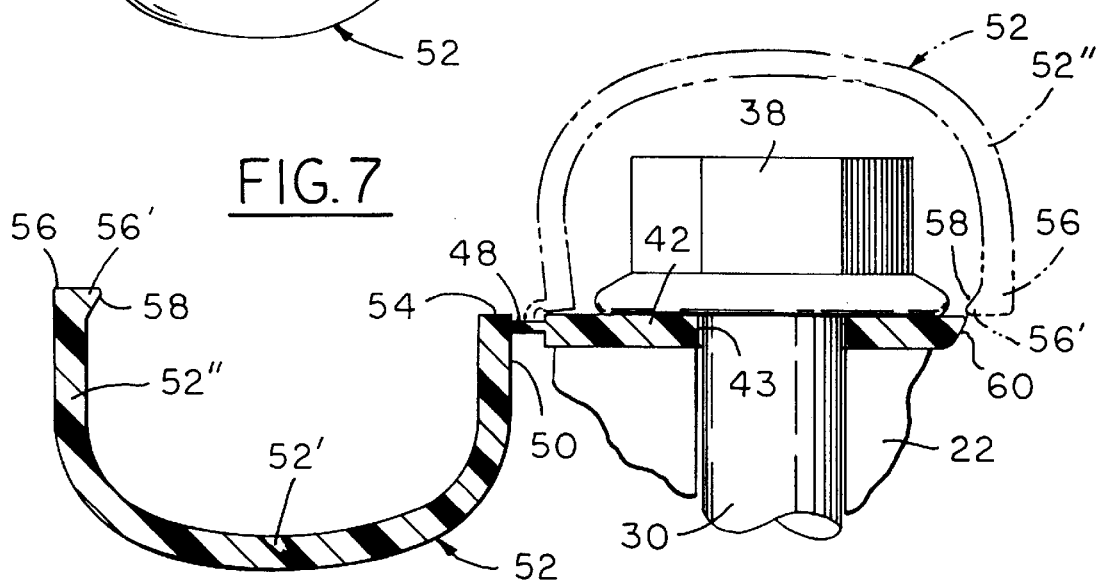

FINISHING COVER FOR FASTENERS

RELATED APPLICATIONS

This application is a continuation-in-part (CIP) of application, Ser. No. 08/920,918 filed Aug. 29, 1997 and now abandoned, by the same inventors and entitled "Finishing Cover for Fasteners."

FIELD OF THE INVENTION

This application relates to an assembly for concealing a head or nut of a fastener and more particularly to a unitary cover for encapsulating a head or nut portion of one or more threaded fasteners. The assembly has a flat base portion for engagement by the fastener(s) and a dome-shaped cap portion connected to the base along a common edge by a thin living hinge portion allowing pivoting of the cap relative to the base from a separated opened condition into a closed position in which the edge of the cap opposite the living hinge is captured by an edge of the base opposite the living hinge.

DESCRIPTION OF RELATED ART

Specialized plastic caps for fasteners are known for the purpose of concealing a portion of an associated fastener. These caps may comprise shell-like covers which are adapted to be snap-fitted to and about the peripheral edge of a metal retainer washers. One example of such caps is disclosed in Caplugs®, Catalog 595©1995 by Protective Closure, Inc.

In contrast to the above described construction, the cover assembly in the present application is directed to a new and improved unitary or one-piece, plastic cover assembly including a washer-like base portion and cap portion. The new assembly achieves new and more demanding standards for encapsulating and concealing a head or nut of a fastener.

SUMMARY OF THE INVENTION

The subject unitary plastic cover assembly utilizes a base portion and cap portion attached together by a living hinge portion to facilitate pivotal movement therebetween for concealing a head or a nut of a fastener. The structure allows selective movement of the cap relative to the base so that the fasteners can be initially installed as well as selectively removed without destruction of the cover assembly.

In a particularly useful embodiment, the subject cover assembly is used to conceal a pair of slightly spaced nuts threadably attached to fastener shanks extending from a vehicle door/window seal. For example, such a device is contemplated for a pair of threaded fasteners located at both ends of an elongated seal adapted to extend along the edge of a removable roof structure such as used on the Dodge Viper roadster. It is desirable to fit the seal along the edge and fix one end and then stretch the seal so the opposite end is positioned correctly and then secured to the roof structure. Without the subject cover assembly, the head or nut portions of the fasteners would form a displeasing appearance.

In addition, the subject cover assembly can be economically produced by molding elastomeric material for providing a reduction in parts cost and the unitary assembly decreases the assembly time to attach the seal to a roof structure. The operation of the cover assembly provides a simple pivoting closure and a snap-lock security of the cap portion to the base portion. This even provides a desirable audible feedback when fully closed during assembly.

Both the base portion and the cap portion each have first and second opposite edges. Together, adjacent base edges and cap edges provide two pairs of edges, one pair constituting a hinging side of the assembly and another constituting an interlocking side. Upon closure of the cap relative to the base portion, the interlocking side of the cap and base engage to secure the two edges together in a closed operative condition.

The cap is however slightly longer than the base providing internal clearance between these parts for cap release purposes. By squeezing the two ends of the cap, the interlock side thereof is deflected and forced outwardly, away from the base, allowing the cap to be easily opened by swinging on the living hinge to provide access to the nuts for adjusting weather seal position.

BRIEF DESCRIPTION OF THE DRAWINGS

FIG. 5 is a perspective view of one preferred embodiment of the finishing cover of FIG. 1;

FIG. 6 shows a perspective view of the embodiment of FIG. 5 rotated 180 degrees illustrating the interior thereof;

FIG. 7 is a cross-sectional taken generally along sight lines 7—7 of FIG. 2 with an alternate near-closed operative position shown in phantom line;

DETAILED DESCRIPTION OF PREFERRED EMBODIMENTS

Figure 1:
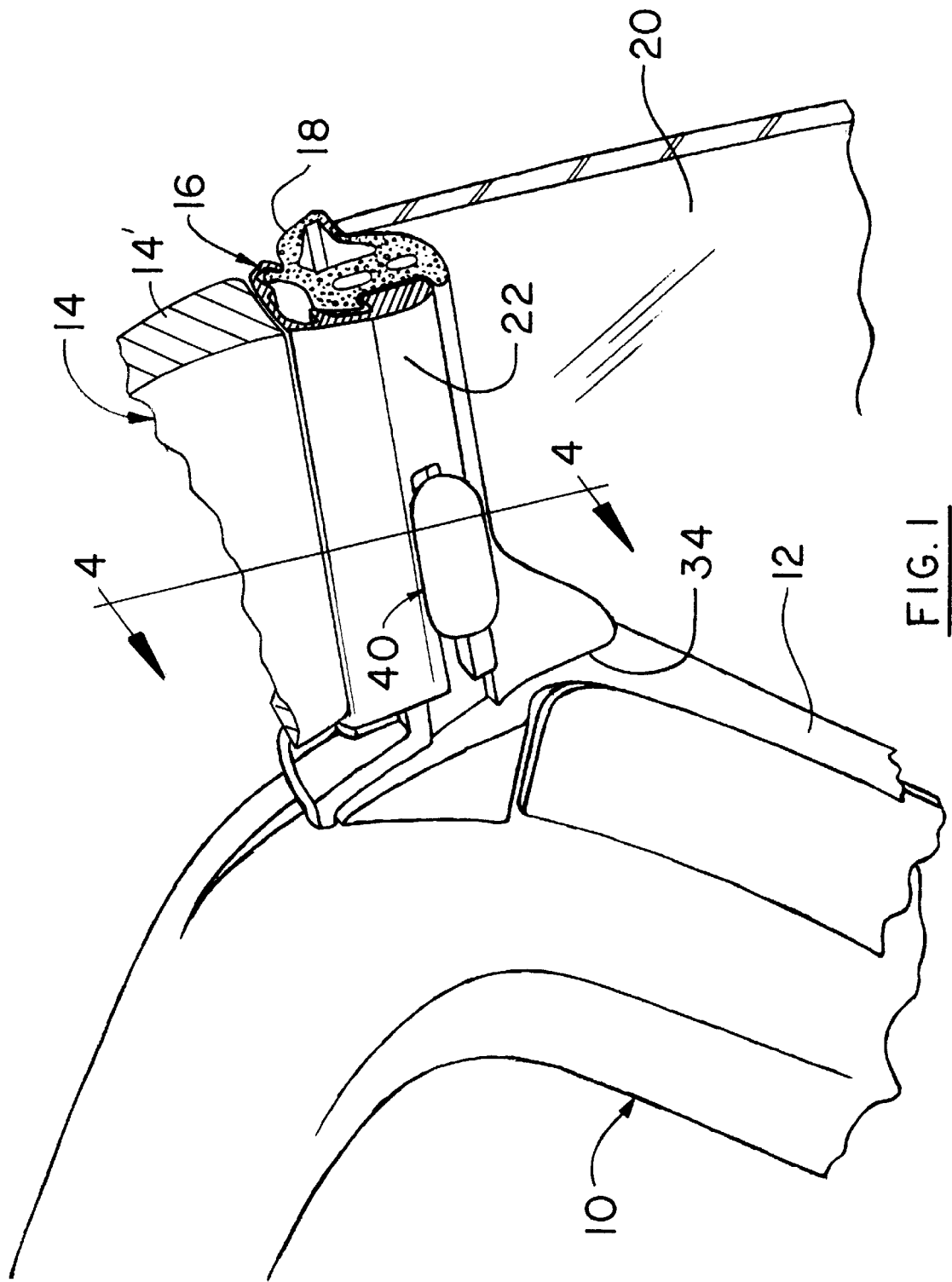
FIG. 1 is a perspective view of a portion of the interior of an automotive vehicle with a finishing cover in position to cover threaded fasteners.
Figure 2:
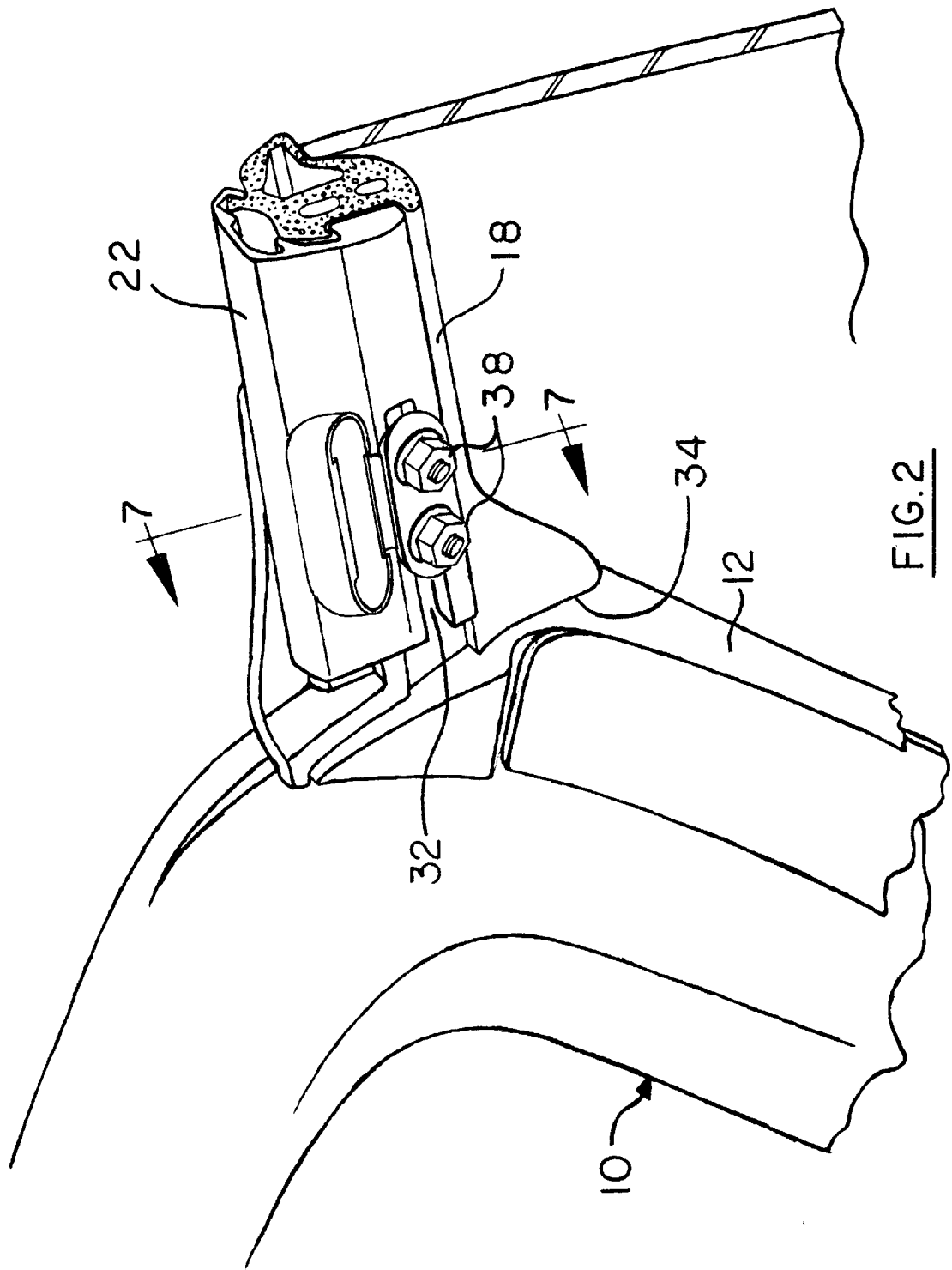
FIG. 2 is a view similar to the view of FIG. 1 with the cap of the finishing cover shown in an open position.
Figure 3:
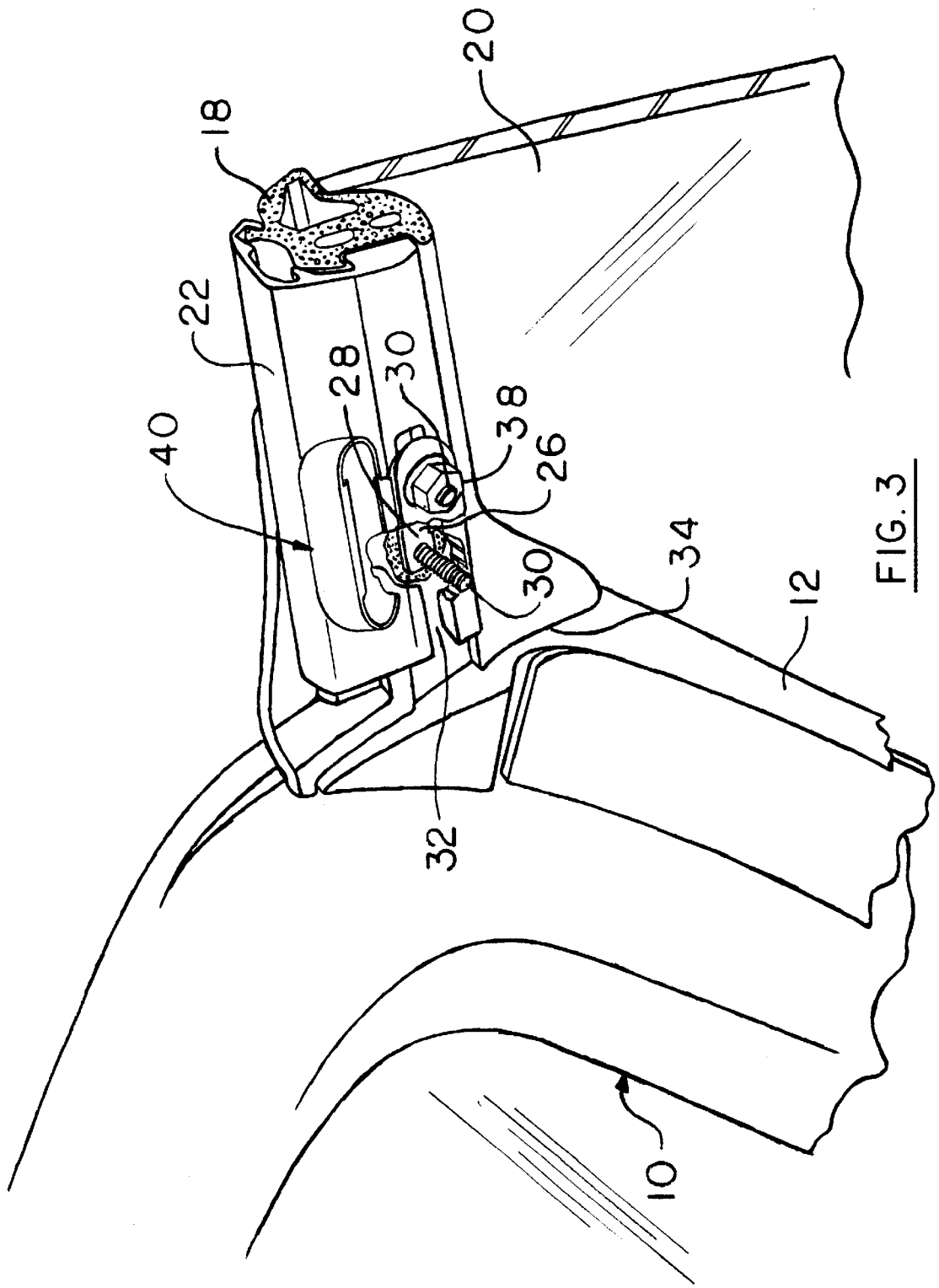
FIG. 3 is a view similar to the view of FIG. 2 with portions broken away to reveal interior features.

Turning now in greater detail to the drawings, FIGS. 1, 2, and 3 show an interior view of a portion of the vehicle as seen by an occupant in the passenger compartment. This view includes the forward or "A" pillar 10 that supports a weather seal 12 made of an elastomer or other suitable material. Also shown is a portion of a removable top 14 including a side rail member 14' with an edge to which an elongated upper seal assembly 16 is attached. The seal assembly 16 includes a header seal 18 having a forward end portions which operatively engages a pillar seal 12 to eliminate and gap therebetween. This engagement between seals 12 and 18 and other members adjacent the upper edge of the side window 20 effects a sealed closure and weather sealing of the occupant compartment when the window is in a closed operative position as shown.

The header seal 18 is an elongated, generally tubular member made of a suitable elastomer, rubber or other resilient sealing material. The seal 18 is typically made by an extrusion process to produce the illustrated interior voids which gives the seal a desirable degree of flexibility. The seal itself is mounted on a longitudinally extending seal support and mounting strip 22 which may be of metal or might be made of a fairly rigid elastomeric material. The mounting strip 22 is preferably fastened to the side rail 141 of the removable top 14 by screws 24 shown in FIG. 4.

Figure 4:
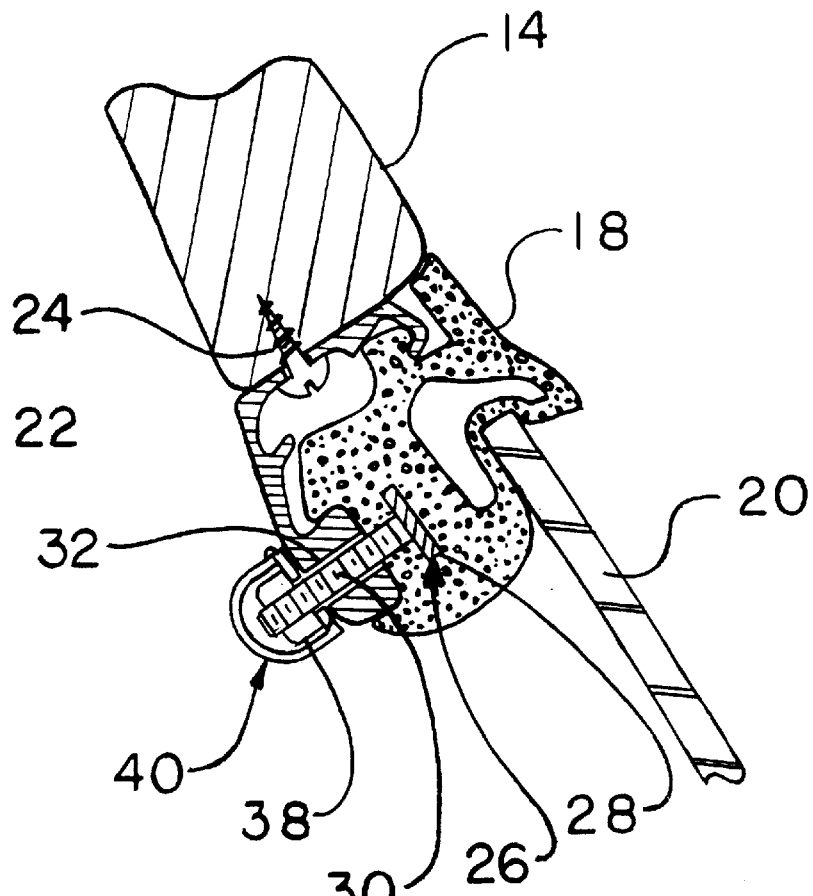
FIG. 4 is a cross sectional view taken generally along sight lines 4—4 of FIG. 1.

The seal 18 is mounted to the support strip 22 in a manner to permit adjustment therebetween. In FIGS. 3 and 4, it can be seen that the attachment of seal 18 to strip 22 is by means of a fastener unit or assembly 26 that includes a flattened base plate 28 which is embedded or molded into the elastomeric material of the seal 18. The base plate 28 supports a pair of laterally spaced threaded shafts or screws with threaded shanks 30 extending generally perpendicularly with respect to the base plate. Shanks 30 extend through the seal material as illustrated in FIG. 4.

Regarding mounting of the seal assembly 18 to the support strip 22, the threaded shanks 30 extend from the seal through an elongated and longitudinally extending adjustment slot 32 in the fixed mounting strip 22 as best seen in FIG. 3. A nut 38 is threaded on to the shank 30 of each shaft at a location outboard of the strip 22.

With the aforedescribed construction, the installation of the header seal 18 includes the process of manually or otherwise gripping the seal and displacing it in a longitudinally direction if necessary so that its forward end portion sealingly engages the pillar seal 12 at the forward corner of the window, thus eliminating any gap between the seals 12 and 18. The slot 32 in the support strip 22 permits corresponding movement of the two threaded shanks 30 in a longitudinal direction of the strip 22. Thus during assembly, such a seal adjustment can be readily made as needed so that the end 34 of the seal 18 is positioned to sealingly mate with the pillar seal 12 which is supported on the A pillar. The desirable adjusted position is permanently established by tightening the two retainer nuts 38 on the threaded shanks 30 bringing the seal 18 tightly against the strip member 22.

It can be easily understood that the opposite rearward end portion of the elongated seal 18 can also be attached to the support strip 22 in a manner identical to the aforedescribed manner so that the rear end of seal 18 is sealingly engaged with another seal member located at the rear edge of the door glass 20.

The Finish Cover Illustrated in FIGS. 5–10

Figure 8:
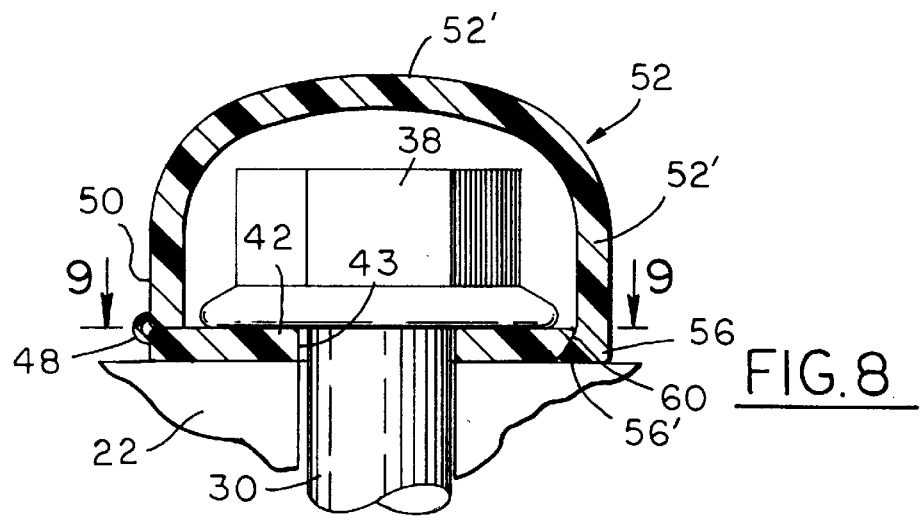
FIG. 8 is a view similar to the view of FIG. 7 showing the cover in a closed position covering a hex nut of a threaded fastener.

As best shown in FIG. 1, a unitary finish cover assembly 40 is used to protect and isolate the hex nuts 38, thus providing a finely finished appearance in the vehicle interior by hiding the nuts. The assembly is preferably molded or otherwise formed from polypropylene, nylon or other suitable resilient and durable elastomeric materials. Details of the finish cover 40 are shown in FIGS. 5 and 6 and include a substantially flat base portion 42 which has longitudinally spaced opening 43 therethrough to receive the shanks 30 of the previously described fastener assembly. The base portion 42 serves as a washer for engagement by the hex nuts 38 of the fastener unit 26 as best seen in FIGS. 7 and 8. The hex nuts 38 retain the base portion 42 to the support strip 22 to augment weather seal adjustment.

Figure 9:
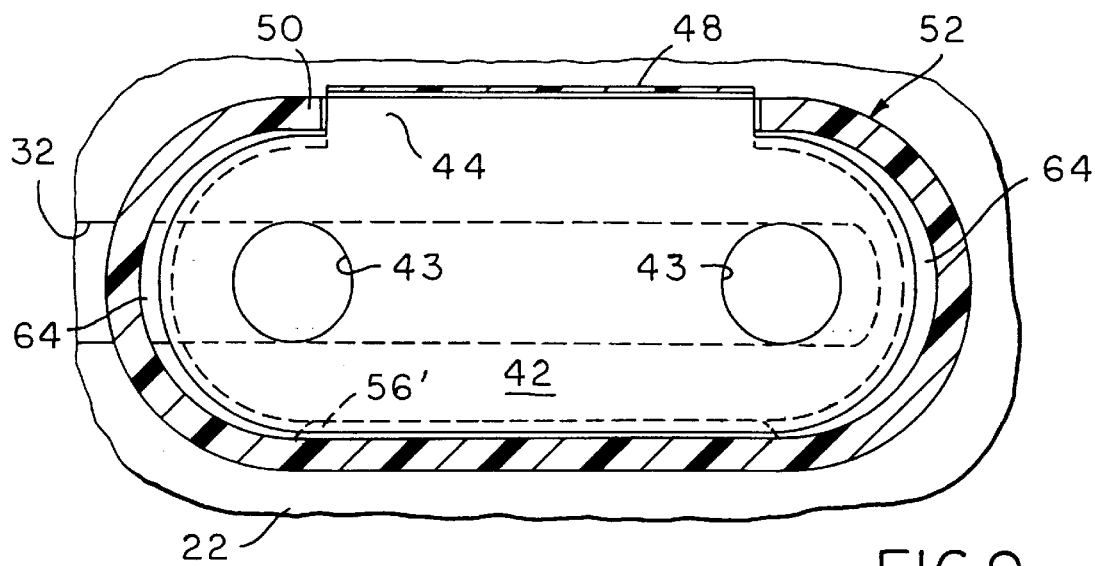
FIG. 9 is a sectioned view taken generally along sight lines 9—9 of FIG. 8 showing the cover in the closed operative position.
Figure 10:
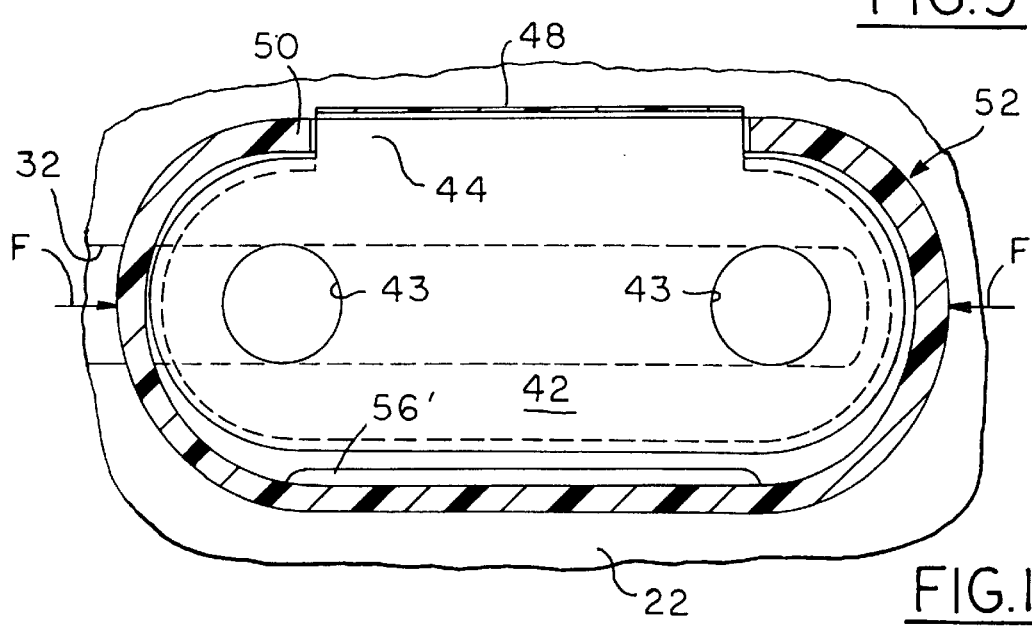
FIG. 10 is a view similar to the view of FIG. 9 showing the cover in a flexed or pinched operative position related to opening the closed cover.

The base portion 42 of the finish cover assembly 40 has a substantially oval shape in plan view as seen in FIGS. 9 and 10. Base 42 has a laterally extending and rectilinear offset 44 formed along an inner side edge thereof. A relatively thin live hinge portion 48 extends laterally from offset portion 44 to integrally connect the base portion 42 with an adjacent side 50 of a cap portion 52. As best seen in FIG. 6, the hinge portion 48 is joined to the cap portion 52 immediately below a rectilinearly shaped cutout 54. The cutout portion 54 in the cap 52 is dimensioned so as to closely receive the base's rectilinearly shaped offset portion 44 when the cap portion 52 is in its closed operative position relative to the base portion 42 as seen in FIGS. 1 and 8. In this closed operative position, the hex nuts 38 are encapsulated or covered by the cap portion 52 and are hidden from a vehicle occupant.

More particularly, the cap portion 52 is defined by a hollow dome-like member with a generally oval footprint as best seen in FIG. 6. One side wall 50 of the cap portion 52 extends from the hinge portion 48 and then gradually turns to form an arch formation or top portion 52'. The top portion then again gradually turns to form an opposite side wall 52" which has a free edge portion 56. The free edge portion has an inwardly directed lip portion 56'. When the cap portion 52 is in a relaxed and undistorted condition, the inner most portion of the lip 56' of free edge 56 and the opposite edge which is adjacent live hinge 48 are spaced apart by a distance slightly less than the width of the base 42. When the cap portion 52 is pivoted on the live hinge 48 toward the closed operative position as illustrated in FIG. 7, the free edge 56 contacts the edge of the base portion 42. The position of the cap portion 52 just before being latched into a closed position is shown by phantom lines in FIG. 7. Since the cap portion 52 is resilient due to the inherent nature of the polypropylene material as used, or other suitable resilient material, the interference between the edges is readily overcome by pressure on the cap portion 52 towards the base portion 42 which results in a slight outward flexure of side wall 52" and thus movement of the lip portion 56' past the outer edge of the base portion 42. Even more specifically, the lip portion 56' defines a beveled inner surface 58 and the edge of the base portion 42 is similarly beveled to form an angled surface 60 which surfaces 58, 60 mate against one another in the cap's closed position to latch the cap to the base as seen in FIG. 8.

More particularly, the base 42 has a width sufficiently greater than the undistorted or relaxed width dimension of the cap portion 52 so that when the cap is pivoted toward its closed position as illustrated in FIG. 7, the lip portion 56' physically contacts the upper surface of the base 42 adjacent its edge. Further closing pressure on the cap portion 52 causes the wall 52" to flex outward until the lip portion 56' can move past the upper edge of the base as is happening in the illustration shown in FIG. 8. This establishes a prelock position of the cap relative to the base as shown in phantom lines. The exertion of additional manual or other closure force in the direction against the cap 52 resultantly deflects the lip portion 56' outwardly to clear the outer edge of the base edge. As the initial interference is overcome, the cap portion 52 is pivoted to a fully closed operative position as shown in FIGS. 8 and 9. This closed position is maintained by the inward movement of the side wall 52" and the lip portion 56' due to the natural recovery of the deflected portions of the cap. Resultantly, the beveled edges 58 and 60 are mated in an interlocking fit best as shown in FIG. 8.

Figure 11:
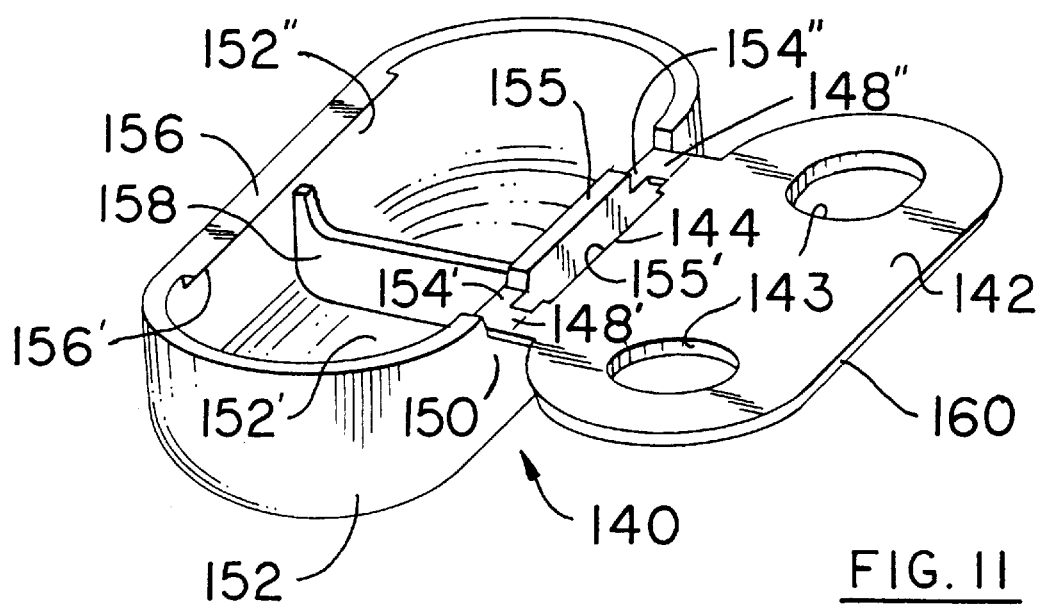
FIG. 11 is a view similar to the view of FIG. 6 but showing another embodiment of the cover degrees illustrating the interior thereof.

The Finish Cover Illustrated in FIG. 11

The base portion 142 of the finish cover assembly 140 has a substantially oval shape in plan view identical to the previously described embodiment seen in FIGS. 9 and 10. Base 142 has a laterally extending and rectilinear offset 144 formed along an inner side edge thereof. At either end portion of the offset 144 are relatively thin live hinge portions 148' and 148". The hinge portions 148' and 148" extend laterally from offset portion 144 to integrally connect the base portion 142 with an adjacent side 150 of a cap portion 152. Adjacent to each hinge portions 148', 148" is a rectilinearly shaped cutout 154', 154" respectively. Left between cutouts 154', 154" is an upwardly projecting portion 155 of the side 150. To accommodate mated closing of the cover portion 152 with the base portion 142, a cutout portion 155' is formed in the offset edge portion 144. Specifically, as the portion 152 is pivoted about the hinges to the closed position in a manner similar to that shown in FIG. 7, the upwardly projecting portion 155 enters the cutout 155' in the offset edge 144. Specifically, the cutout portion 155' in the base 142 is dimensioned so as to closely receive the portion 155 projecting from the cap portion 152.

As with the previous embodiment, the cap portion 152 is defined by a hollow dome-like member with a generally oval footprint. The side wall 150 of the cap portion 152 extends from the hinge portions 148', 148" and gradually turns to form an arch formation or top portion 152'. The top portion 152' then again gradually turns to form an opposite side wall 152" which has a free edge portion 156. The free edge portion 156 has an inwardly directed lip portion 156'. When the cap portion 152 is in a relaxed and undistorted condition, the inner most portion of the lip 156' of free edge 156 and the opposite edge which is adjacent live hinge portions 148', 148" are spaced apart by a distance slightly less than the width of the base 142. The above described spacing of the opposite side walls 150 and 152" of the cap portion are reinforced by an internal wall portion 158. When the cap portion 152 is pivoted on the live hinge portions 148', 148" toward the closed operative position, the free edge 156 contacts an edge portion 160 of the base portion 142. The position of the cap portion 152 just before being latched into a closed position is identical to the position shown by phantom lines in FIG. 7. Since the cap portion 152 is resilient due to the inherent nature of the polypropylene material as used, or other suitable resilient material, the interference between the edges is readily overcome by pressure on the cap portion 52 towards the base portion 42 which results in a slight outward flexure of side wall 152" and thus movement of the lip portion 156' past the outer edge 160 of the base portion 142. As with the previous embodiment, the lip portion 156' defines a beveled inner surface and the edge 160 of the base portion 142 is similarly beveled to form an angled surface. Accordingly, these surfaces mate against one another in the cap's closed position to latch the cap portion 152 to the base portion 142. In this embodiment, the side wall 150 is strengthened by the upwardly projecting portion 155 as well as the internal stiffener wall 158.

In the preferred embodiment, the cap-to-base fit provides a snap-lock feature with an audible feedback to the operator of the finish cover. This ensures that a proper interlock has occurred. The sound of closure results from the recovery of the free edge of the cap against the corresponding edge of the base and the contact of the free end of the cap against the outer surface of mounting strip 22.

In the closed position the resilience of the cap and particularly of the edge portions 62 of the cap adjacent and outboard of the live hinge 48 places the base and cap assembly when closed together in tension against the interlock to keep the cover securely latched and closed.

As best seen in FIG. 9, the longitudinal, interior dimension of the cap 52 is longer than the longitudinal dimension of the base portion 42. This provides internal clearances 64 between the cap's end wall and the adjacent end of the base portion. The clearances 64 permit the cap to be manually squeezed or distorted in the longitudinal direction as represented by arrows F in FIG. 10. The resultant vise-like pinch deflects the cap and forces the free, interlocking side wall 52" outwardly and away from the associated edge of the base. This moves the lip portion 56' out of engagement with the beveled surface 60 of the base so that the cap portion 52 is released from its interlocking relationship with the base. Resultantly, the cap portion 52 can then be pivoted about the live hinge 48 toward an opened position as seen in FIGS. 2 and 7. This ability to open the finish cover permits one access to the hex nuts 38 for servicing the associated seal 18. After release of the pinching force the cap quickly recovers to its natural undeflected configuration so that it is ready to be again pivoted to its nut hiding closed position.

When the cap portion 52 is closed upon the base portion 42, a smooth, finely finished surface and appearance is achieved in the vehicle interior with the hex nuts 38 hidden. Also, opening and closing the cap portion does not require any tools since both are manual operations.

In FIG. 11, another embodiment of the cover is illustrated. Specifically, the finish cover 140 includes a substantially flat base portion 142 which has longitudinally spaced opening 143 therethrough to receive the shanks 30 of the previously described fastener assembly. The base portion 142 serves as a washer for engagement by the hex nuts 38 of the fastener unit 26 in the manner best seen in FIGS. 7 and 8. The hex nuts 38 retain the base portion 142 to the support strip 22 to augment weather seal adjustment.

While a preferred embodiment of the invention has been shown and described, other embodiments will now become apparent to those skilled in the art. Accordingly, this invention is not to be limited to that which is shown and described but by the following claims.

The invention claimed is:

1. A fastener and a unitary enclosure assembly therefore, two elongated members such as a seal of resilient elastomer material and a support member adapted to be attached together by said fastener which has an exposed portion and a shank portion, a adjustable connecting mechanism including the fastener between the two members permitting adjustment therebetween in the elongated, longitudinal extent of the members, said unitary enclosure assembly including a generally flat base portion with an aperture therethrough for passage of said shank portion of said fastener wherein said base portion serves as a washer for said exposed portion of said fastener, said base portion defining a pair of laterally spaced side edges, a generally hollow and dome-shaped cap portion defining a pair of laterally spaced side edges, a thin live-hinge portion integrally joining both said base and said cap portions thereby connecting a pair of side edges of said base and said cap portions to permit pivoting of said cap portion about said live hinge portion between an opened angular position with respect to said base portion and a closed position in which said dome-shaped cap portion overlies said base portion to cover said exposed portion of said fastener, said cap portion having an inwardly extending catch means carried on the side opposite said hinge portion which initially contacts a corresponding side edge of said base portion when the cap portion pivots into its closed operative position and which then is deflected outward of said corresponding edge of said base portion thereby permitting further movement toward the fully closed operative position wherein the catch means of said cap portion engages the edge of the base portion to latch the cap and base together.

2. An unitary cover assembly of resilient elastomeric plastic material for selectively hiding an exposed portion of a fastener which fastener also has a shank portion extending between two members for retaining said two members together comprising a flat base portion having an inner and an outer side edge and having opposed ends, said base portion being of fixed width and length, a closure in the form of a cap portion having an inner and an outer side edge and having opposed ends, said cap portion being generally hollow and dome-shaped to define a shell portion arching between said side edges and said opposed ends, a live hinge portion integral with and joining said inner side edge of said base to the inner side edge of said cap for connecting said cap and base portions and permitting pivotal movement between an opened position in which said cap and said base portions are in an angulated side by side relationship and a closed position in which said cap and its edge portions thereof engage corresponding base edges, said base portion having an external bevel on its outer side edge, said outer side edge of said cap portion having an internal beveled surface mateable with the beveled surface on the base portion when in the closed operative position to releasably latch said cap portion to said base portion, said outer side edge of said cap portion being deflected outwardly on movement past the outer side edge of said base portion as the cap portion moves to its fully closed position so that said beveled surfaces thereafter engage one another to releasably latch said cap portion to said base portion.

3. The unitary cover assembly of claim 2 wherein said base portion has a width normally greater than the internal width of said cap portion and has a length less than the internal length of said cap portion, said cap and base portions being dimensioned so that said outer side edge of said cap portion snap fits over the corresponding outer side edge of said base portion to releasably latch said cap and base portions together and so that when said cap portion is manually grasped at its opposed ends and said opposed ends are moved inwardly toward one another in response to an inwardly imposed load thereon said outer side edge of said cap portion is deflected outwardly away from the corresponding outer side edge of said base portion to selectively release said cap portion from said base portion to reveal the exposed portion of said fastener.

4. A one-piece cover assembly of resilient elastomeric plastics material for encapsulating an exposed portion of a fastener assembly which also has a shank portion, both portions for retaining two parts relative to one another comprising: a base portion and a cap portion, said base portion having an opening therethrough for receiving the shank portion of said fastener therethrough, each of said base and cap portions having an outer edge and each having an inner edge, said inner edges being adjacent to one another and interconnected by a live hinge integral with both base and cap so that said cap portion can be pivoted relative to said base portion about said live hinge between an opened position in which said cap and base portions are angularity separated from one another and a closed position in which said cap portion is positioned in an overlying relationship to said base portion with said outer edges adjacent to one another, said base portion being substantially flat and said cap being substantially hollow and domed-shaped so as to be capable of fully enclosing the exposed portion of said fastener assembly when said cap member is in the closed position relative to said base portion, and a latch mechanism formed by interlocking mating surfaces of said cap and base portions for releasably connecting and interlocking said cap portion to said base portion when said portions are in said closed position wherein said interlocking mating surfaces are in the form of a pair of elongated beveled edges, one formed on each of said cap and base portions which beveled edges are positioned to engage one another for latching said cap portion to said base portion in a closed operative position but capable of moving apart to unlatch said cap portion from said base portion toward an opened operative position.

5. The cover assembly as defined in claim 4 wherein the interior of said cap portion has a length which is greater than the corresponding length of said base portion so that a manually applied force can be selectively applied to opposite ends of said cap portion to cause an outward deflection of said cap's beveled edge away from the corresponding beveled edge of said base portion which effectively releases engagement of said cap portion with said base portion so that the cap portion can pivot toward an opened position.

\* \* \* \* \*